United States Patent
Fowell et al.

[11] Patent Number: 6,032,903
[45] Date of Patent: Mar. 7, 2000

[54] COOPERATIVE CONTROL STRUCTURES AND METHODS FOR SATELLITE SPIN AXIS CONTROL

[75] Inventors: Richard A. Fowell, Culver City; Qinghong W. Wang, Torrance, both of Calif.

[73] Assignee: Hughes Electronics Corporation, El Segundo, Calif.

[21] Appl. No.: 09/022,991

[22] Filed: Feb. 12, 1998

[51] Int. Cl.[7] .............................. B64G 1/28; B64G 1/26
[52] U.S. Cl. ....................... 244/165; 244/164; 244/169
[58] Field of Search .................................. 244/165, 169, 244/172, 176, 158 R, 170, 164, 175

[56] References Cited

U.S. PATENT DOCUMENTS

| | | |
|---|---|---|
| 4,012,018 | 3/1977 | Lorell et al. . |
| 4,275,861 | 6/1981 | Hubert . |
| 4,288,051 | 9/1981 | Goschel . |
| 4,961,551 | 10/1990 | Rosen ........................................ 244/164 |
| 5,012,992 | 5/1991 | Sslvatore ................................. 244/3.23 |
| 5,067,673 | 11/1991 | Fong . |
| 5,098,041 | 3/1992 | Uetrecht . |
| 5,441,222 | 8/1995 | Rosen . |
| 5,452,869 | 9/1995 | Basuthakur .............................. 244/164 |
| 5,608,634 | 3/1997 | Goodzeit et al. . |
| 5,806,804 | 9/1998 | Goodzeit et al. . |

OTHER PUBLICATIONS

Loebel, Michael, Guidance and Control—II, Academic Press, 1964, New York, pp. 313–337.

Salvatore, J, et al., Galaxy IIIR Transfer Orbit Attitude Control, G&C Conference, Noordwigk, Netherlands, Fall, 1996.

McCanna, Jason, Dynamic Imbalance would Counter Off-center Thrust, NASA Tech–Brief, Nov., 1994, p 86.

Lorell, Kenneth, et al., An Automatic Mass–Trim System for Spinning Spacecraft, AIAA Journal, vol. 10, No. 8, Aug., 1972, pp. 10–13.

*Primary Examiner*—Peter M. Poon
*Assistant Examiner*—Tien Dinh
*Attorney, Agent, or Firm*—Terje Gudmestad; Georgann S. Grunebach; Michael W. Sales

[57] ABSTRACT

Structures and methods are provided to effect satellite maneuvers in the presence of disturbance torques with enhanced fuel efficiency. A thruster control loop is combined with a wheel control loop in which the wheels respond to an estimate of the disturbance torques (e.g., an angular acceleration estimate, a thruster torque command or a filtered thruster torque command) to create a counteracting gyroscopic torque. Simulations of the invention's methods have shown they have the authority of all-thruster control systems and fuel efficiency that rivals that that of all-wheel control systems.

27 Claims, 9 Drawing Sheets

COOPERATIVE CONTROL STRUCTURES AND METHODS FOR SATELLITE SPIN AXIS CONTROL

BACKGROUND OF THE INVENTION

1. Field of the Invention

The present invention relates generally to spinning satellites and more particularly to satellite spin and attitude control.

2. Description of the Related Art

During their operational lifetime, satellites are involved in a variety of maneuvers which require careful control of the satellite's attitude. An exemplary situation is shown in the orbit maneuvers 18 of FIG. 1 that place a satellite 20 into a geostationary orbit (GEO) 24 about the earth 26. In these maneuvers, the satellite 20 is initially launched into a low earth orbit (LEO) 30 by a launcher.

A first velocity increment is then applied (e.g., by a last stage of the launcher) to the satellite 20 to inject it into an elliptical geosynchronous transfer orbit (GTO) 32 which has a perigee 34 tangent to the LEO 30 and an apogee 36 tangent to the GEO 24. At the apogee 36, a second velocity increment injects the satellite 20 into the GEO 24. This final velocity increment is typically applied with a liquid apogee motor (LAM) 38 that is carried by the satellite.

In general, the GTO 32 and the GEO 24 are not coplanar but are inclined from each other by an inclination angle. The inclination angle is essentially a function of the latitude of the earth site from which the satellite 20 was launched (e.g., the GTO 32 and the GEO 24 are typically coplanar only if the launch site was on the earth's equator).

Accordingly, the schematized illustration 40 of FIG. 2 illustrates that the GTO 32 of FIG. 1 is inclined from an equatorial plane 42 by an inclination angle 44. The satellite (20 in FIG. 1) has a velocity at the GTO's apogee (36 in FIG. 1) that is represented by the apogee velocity vector 46 which is in the plane of the GTO 32 and tangent to the GTO. The apogee velocity vector has a magnitude representative of a typical apogee velocity (e.g., ~1.6 km/sec). In contrast, a GEO velocity vector 48 is in the equatorial plane 42, is tangent to the GEO (24 in FIG. 1) and has a magnitude (~3.07 km/sec) that represents the velocity (at the perigee 36) of a satellite in the GEO. For an exemplary GTO which resulted from a launch at an earth latitude of 28 degrees, the inclination angle 44 is ~28 degrees.

For clarity, an enlarged view 45 of the apogee velocity vector 46 and the GEO velocity vector 48 is shown in FIG. 3. If no plane change were required, a velocity increment equal to the difference between these vectors (~1.5 km/sec) would be sufficient for circularization of the satellite's LEO and ejection of the satellite into the GEO (24 in FIG. 1). However, the vector addition of FIG. 3 forms an injection velocity vector 50 with a magnitude of ~1.8 km/sec and an orientation dictated by the velocity vectors 46 and 48. Accordingly, to inject the satellite 20 into the GEO 24 its LAM 38 must be aligned with the velocity vector 50 and the LAM must generate a force sufficient to achieve a velocity increase of ~1.8 km/sec in the satellite 20.

This simplified injection process implies that the LAM can deliver an impulse of sufficient magnitude to achieve orbit injection. In actual practice, a lengthy LAM burn time is required and it is generally more fuel efficient to divide the burn time into a plurality of LAM burns. For example, a first LAM burn at the apogee 36 might reduce the ellipticity of the GTO 32 as indicated by the modified elliptical orbit 32A of FIG. 1. This LAM burn could also reduce the inclination angle 44 so that the apogee velocity vector 46 is changed to a modified apogee velocity vector 46A in FIG. 3. Additional LAM burns would then generate elliptical orbits 32B, 32C and so on with the velocity vector changed to apogee velocity vectors 46B, 46C and so on. A final LAM burn would circularize the orbit and reduce the inclination angle 44 to zero.

A summary of conventional GEO injection methods will be facilitated by preceding it with a description of the satellite 20 as envisioned in the present invention and as detailed in FIGS. 4A–4C.

The spatial relationships of elements of the satellite 20 can be defined by reference to an orthogonal body frame 62 that has a longitudinal z axis 63 and a pair of transverse axes in the form of a y axis 64 and an x axis 65. A satellite body 66 carries the LAM 38 on a lower body face 67 with the LAM having a LAM axis 68 that is nominally aligned with the z axis 63. In addition, the body 62 carries a thruster system 70 and a wheel system 72.

Thruster systems of the invention may be arranged to effect a 3 axis control, i.e., they can generate any torque vector that can be defined by the body frame 62. Because the thrusters oppose primarily transverse disturbance torques, the teachings of the invention can be practiced, however, with thruster systems having two degrees of freedom (e.g., two thrusters whose torques are noncolinear with each other and transverse to the LAM axis 68) or having a single degree of freedom (e.g., a single thruster whose torque is transverse to the LAM axis).

An exemplary thruster system 70 is shown to have four axially-oriented thrusters 74 on the lower body face 67. Each is spaced from the z axis 63 and positioned in a different body corner. These thrusters can generate torques about the x and y body axes 64 and 65 (i.e., torque vectors aligned with the axes 64 and 65). In addition, tangentially-oriented thruster pairs 78 and 79 are carried on opposite body faces 80 and 81. These thrusters can generate torques about the z body axis 63 (i.e., torque vectors aligned with the axis 63). Accordingly, the thruster system 70 can effect satellite rotation about any axis of the body frame 62.

Wheel systems of the invention may also be arranged to effect a 3 axis control. Because the wheels also oppose primarily transverse disturbance torques, the teachings of the invention can be practiced with wheel systems having two degrees of freedom (e.g., two noncolinear wheels which are noncolinear with the LAM axis 68) or having a single degree of freedom (e.g., a single wheel which is noncolinear with the LAM axis).

An exemplary wheel system 72 is shown with four wheels 84 which are spaced from the z axis 63, equally spaced circumferentially and angled inward. When the satellite is spinning about the z axis 63, they preferably generate torque about axes 64 and 65 (i.e., torque vectors in x–y plane) by virtue of their angular momentum and a body rate spin. The wheels of the invention can be either momentum wheels or reaction wheels (i.e., they can form either a zero-momentum or a momentum-bias system).

The satellite 20 also includes other conventional satellite elements such as fuel tanks 88 and an electrical power supply system which has batteries 89 and solar panels 90 that carry solar cell arrays 92. The fuel tanks are coupled to supply fuel to the LAM 38 and the thruster system 70. After injection of the satellite 20 into the GEO (24 in FIG. 1), the solar panels 90 would be extended to the deployed position that is indicated in broken lines (for clarity of illustration, the solar panels are shown only in FIGS. 4A and 4C). Although the satellite 20 has been shown to have planar exterior faces, it can have, in general, a variety of configurations (e.g., a cylindrical shape as indicated by the broken circle 96 in the bottom view of FIG. 4C.

Transferring the satellite 20 from the LEO 30 to the GEO 24 of FIG. 1 requires the use of considerable thruster fuel. Accordingly, a substantial portion of the satellite's original mass is lost in this maneuver. In an exemplary situation, a 2700 kg satellite in the LEO 30 may have a mass of only 1800 kg after placement into the GEO 24. Maneuvers which can reduce this mass loss (i.e., reduce fuel use) are of significant importance because the reduction facilitates an increase of satellite life and satellite revenue.

Satellite stabilization during orbit injection has typically been achieved by simply spinning the satellite about the axis of its LAM (the z axis 63 of FIGS. 4A and 4B). If the resultant momentum is sufficiently large, it inhibits the attitude disturbances that are urged by various disturbance torques that are imposed during the orbit injection process. The largest disturbance torque is typically due to spatial offset between the satellite's center of gravity (86 in FIGS. 4A and 4B) and the LAM axis (68 in FIGS. 4A and 4B).

To carry out a useful orbit injection process, therefore, a satellite's spin and attitude control system preferably, (a) spins the satellite about its LAM axis (even if the LAM axis is not an equilibrium spin axis, i.e., a spin axis that is colinear with a spin-induced momentum vector) and (b) aligns the LAM axis with a desired inertial direction (e.g., the velocity vector 50 of FIG. 2) during the LAM's burn time. When the stabilization provided by spin momentum is not sufficiently stiff, these process objectives have often been performed (e.g., see Salvatore, J., et al., *Galaxy IIIR Transfer Orbit Attitude Control,* G&C Conference, Noordwijk, Netherlands, Fall, 1996) by an all-thruster control system (e.g., exclusive use of the thruster system 70 of FIGS. 4A–4C). Although all-thruster control systems generally have the torque authority to manage processes (a) and (b), such systems are not fuel-efficient.

In another prior art control method (e.g., see Loebel, Michael, *Guidance and Control - II,* Academic Press, 1964, New York, pp. 313–337), process objective (a) has been performed by an all-wheel control system (e.g., exclusive use of the wheel system 72 of FIGS. 4A–4C). Although the wheels of a wheel system can be appropriately sized to handle LAM-induced torques, this requires them to be larger than is typically needed for efficient management of operational attitude control after orbit injection (i.e., during the service phase of the satellite's lifetime). For example, Loebel employs control moment gyroscopes which are powerful but are larger, more expensive and more complex than fixed wheel systems.

A simple combination of an all-thruster system and an independent all-wheel system is discouraged because corrective action of the thruster system suppresses rotational errors. Thus, the error signals that are typically required to generate corrective action in an all-wheel system are reduced. In addition, the thruster action adds noise to these error signals so that torque and power are wasted as the all-wheel system responds to degraded signals. These problems are also unresolved in a system discussed by Loebel which used wheels and thrusters for above-mentioned process (a) and (b) respectively.

Conventional spin and attitude control systems, therefore, have typically been either fuel-inefficient, have required wheel systems with grossly oversized torque authority (for conventional satellite missions) or have presented system operational problems.

The present invention is directed to accurate, fuel-efficient control structures and methods which have sufficient torque authority to effect satellite maneuvers (e.g., spin a satellite about a desired spin axis and align that spin axis with a desired inertial direction) in the presence of disturbance torques but which can also realize enhanced fuel efficiency.

These objectives are achieved by cooperatively combining a thruster control loop with a wheel control loop in which the wheels respond to an estimate of the disturbance torques (e.g., an angular acceleration estimate, a thruster torque command or a filtered thruster torque command).

In process steps of the thruster control loop, at least one of a desired satellite rotation rate, a desired satellite attitude and a desired angular acceleration is commanded, the commanded parameter is compared with sensed satellite parameters to generate at least one error signal and thruster correction torques are applied to the satellite to reduce the error signal.

In process steps of the wheel control loop, an estimate of the disturbance torques is generated, and, in response to this estimate, wheel correction torques are used to change the internal momentum of the satellite to reduce the magnitude of the thruster correction torques and thereby reduce the use of thruster fuel. The methods of the invention can also be practiced by using received or stored predetermined estimates for the disturbance torque estimate.

Simulations of the invention's methods have shown they have the authority of all-thruster control systems and fuel efficiency that rivals that that of all-wheel control systems.

The novel features of the invention are set forth with particularity in the appended claims. The invention will be best understood from the following description when read in conjunction with the accompanying drawings.

DETAILED DESCRIPTION OF THE PREFERRED EMBODIMENTS

Figure 1:
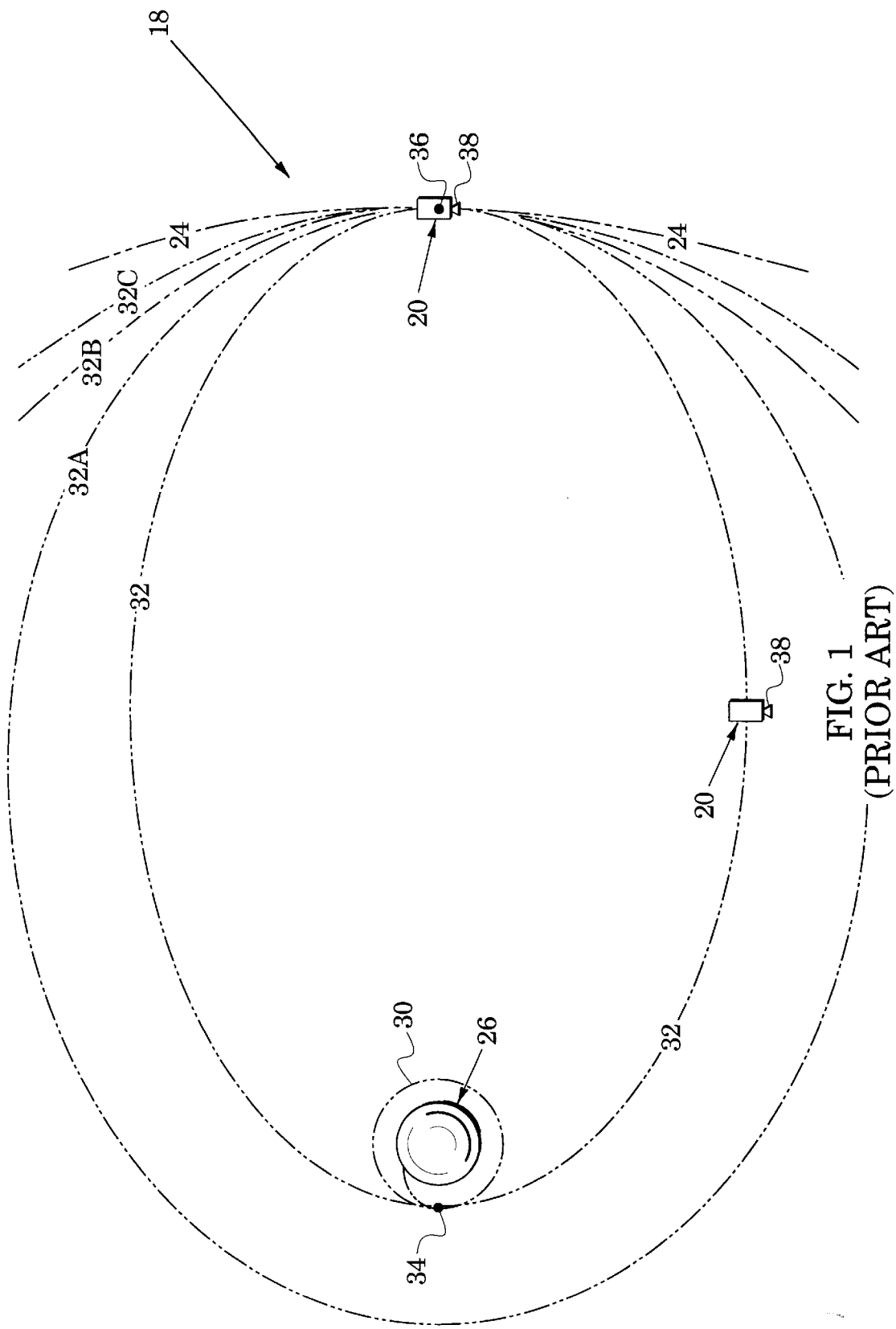
FIG. 1 is a top plan view of an exemplary orbital transition plan which places a satellite in a geostationary orbit (GEO)
Figure 2:
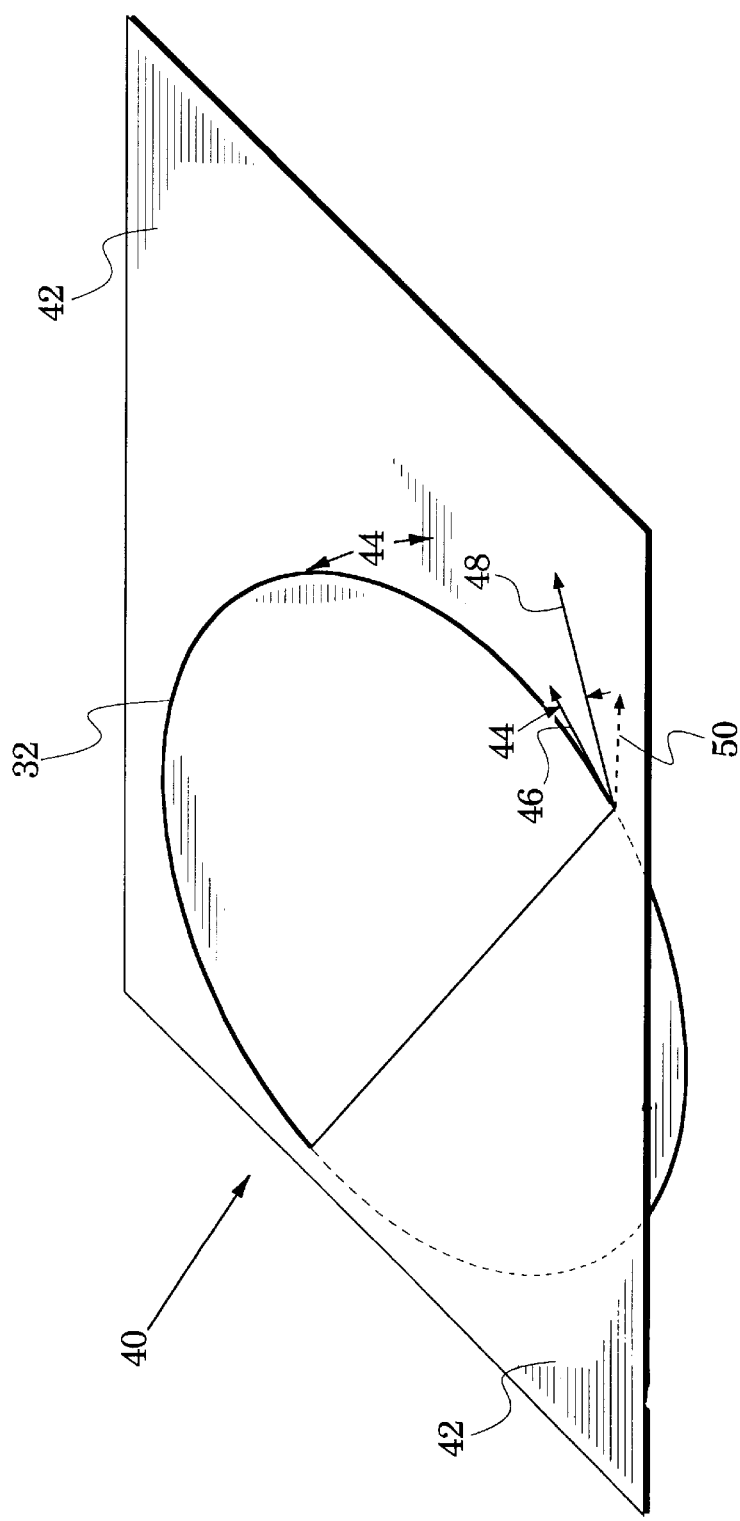
FIG. 2 is a schematized perspective view of the transition plan of FIG. 1 which illustrates an apogee velocity vector of a satellite in a transfer orbit of FIG. 1, a GEO velocity vector of a satellite in the GEO and an injection velocity vector required to inject the satellite into the GEO.
Figure 3:
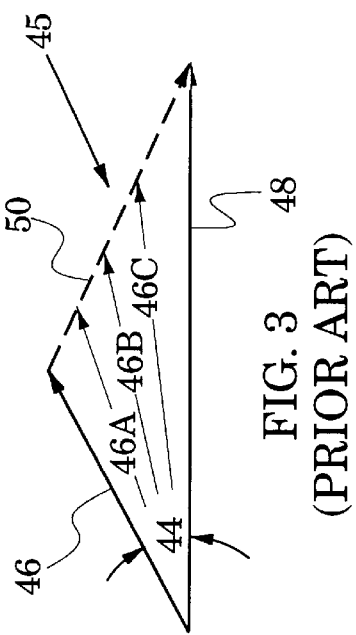
FIG. 3 is an enlarged view which illustrates vector addition that generates the injection velocity vector of FIG. 2.
Figure 4:
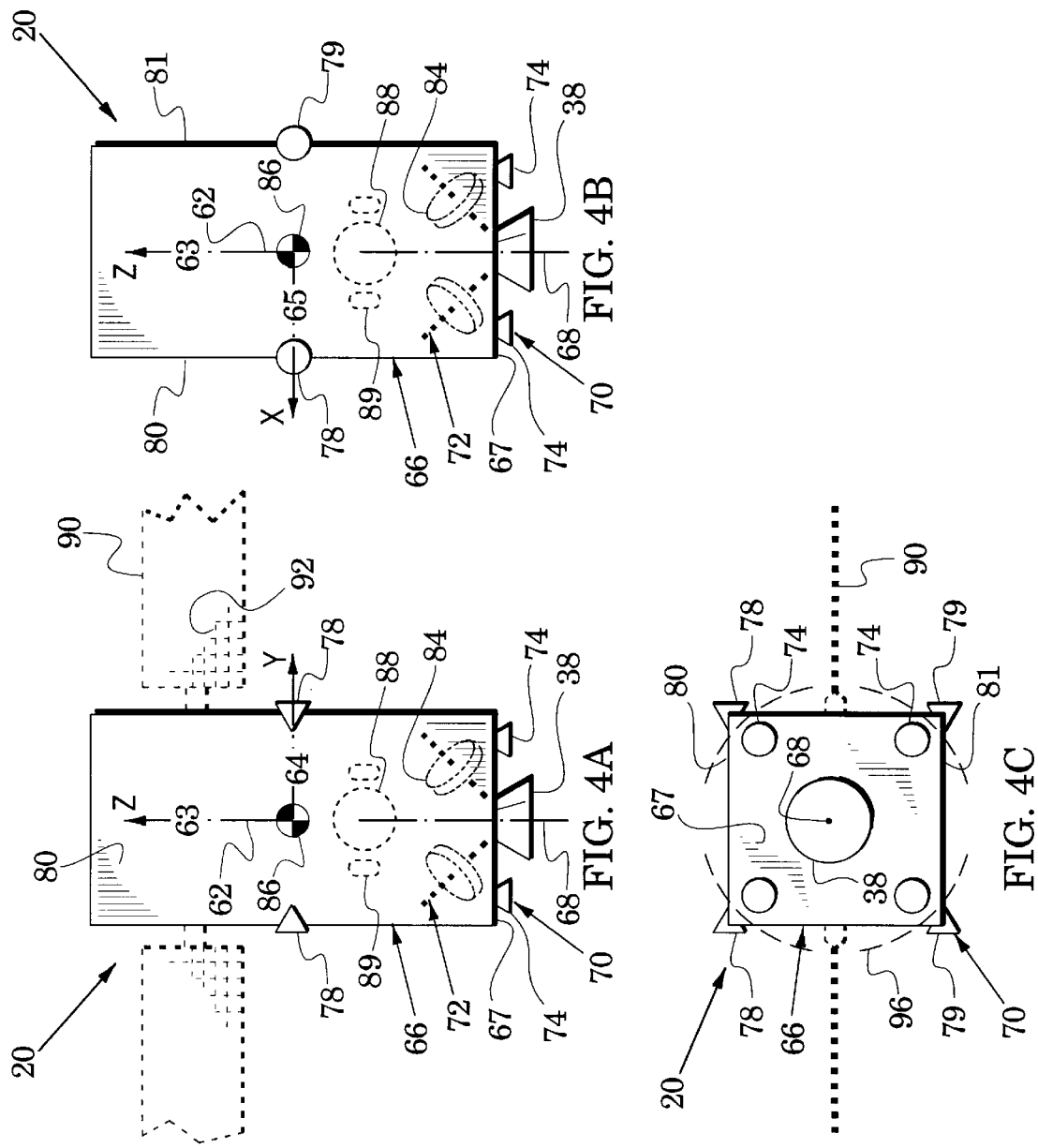
FIGS. 4A–4C are front elevation, side elevation and bottom plan views respectively of a satellite of the present invention.
Figure 5:
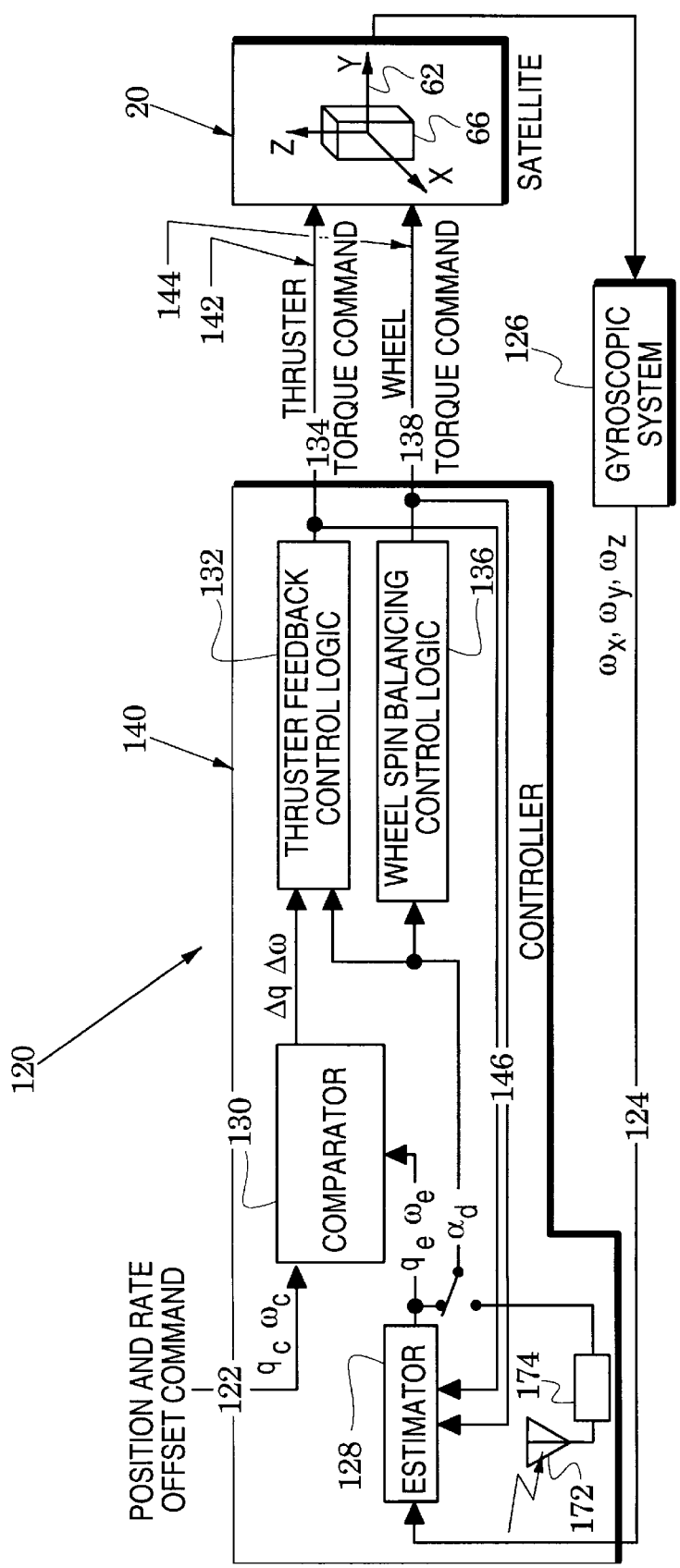
FIG. 5 is a block diagram of a spin and attitude control system in the satellite of FIGS. 4A–4C.

FIG. 5 illustrates a block diagram of a spin and attitude control system 120 of the present invention. In the system 120, the satellite 20 of FIGS. 4A–4C is schematically shown by its body 66 and its body frame 62. In the system 120, a position and rate command signal 122 specifies a desired position vector $q_c$ and a desired rotational velocity vector $\omega_c$ for the satellite 20.

A feedback signal 124 of rotational velocities $\omega_x$, $\omega_y$ and $\omega^z$ is generated by a sensor system in the form of a gyroscopic system 126 in the satellite 20. From this feedback signal, an estimator 128 generates an estimated position vector $q_e$, an estimated rate vector $\omega_e$ and a disturbance torque estimate in the form of an angular disturbance acceleration vector $\alpha_d$. A comparator 130 receives the desired position vector $q_c$, the desired rotational velocity vector $\omega_c$, the estimated position vector $q_e$ and the estimated rate vector $\omega_e$.

From these inputs, the comparator 130 generates an error position vector $\Delta_q$ and an error rate vector $\Delta\omega$. These error signals and the estimated angular disturbance acceleration vector $\alpha_d$ from the estimator 128 are input to a thruster feedback control logic system 132. This system generates a thruster torque command signal 134 which is coupled to the thruster system (70 in FIGS. 4A–4C).

The estimated angular disturbance acceleration vector $\alpha_d$ is also input to a wheel spin balancing control logic system 136 which generates a wheel torque command 138. This latter command is coupled to the wheel system (72 in FIGS. 4A–4C).

The estimator 128, the comparator 130 and the feedback logic systems 132 and 136 form a controller 140. A thruster feedback control loop 142 includes the path of the thruster torque command 134 and a wheel feedback control loop 144 includes the wheel torque command 138.

Generation of the estimated position $q_e$, rate $\omega_e$ and disturbance acceleration $\alpha_d$ by the estimator 128 can be facilitated by knowledge of the thruster torque command 134 and the wheel torque command 138. This availability is indicated by optional feedback signals 146. The teachings of the invention can also be practiced without these optional feedback signals and without feedback of the rotational velocity $\omega_z$ from the gyroscopic system 126.

In operation of the satellite 20 and its control system 120, the thruster feedback control loop 142 receives angular rotation signals from the gyroscopic system 126. These signals indicate inertial rotation of the satellite's body frame (62 in FIGS. 4A–4C) in inertial space. From these signals, the estimator 128 generates estimates ($q_e$, $\omega_e$) of the satellite's attitude and rotation rate. These are compared in the comparator 130 to the commanded attitude and rotation rate ($q_c$, $\omega_c$) to form attitude and rate error signals ($\Delta q$, $\Delta\omega$). Typically, the attitude of concern is that the LAM axis direction in inertial space and the rotation angle of the satellite about the LAM axis is not explicitly controlled. The rotation rate is the angular rate vector of the satellite expressed in the satellite's body frame 62.

A 3 axis control thruster system such as the thruster system 70 of FIGS. 4A–4C can respond to these error signals and exert appropriate torques on the satellite 20 so as to reduce satellite attitude and rate errors ($\Delta q$, $\Delta\omega$). Accordingly, the thruster feedback control logic responds to the error signals and generates torque commands 134 which are appropriate for the particular thruster system that is being used.

In an operational example, firing of the LAM (38 in FIGS. 4A–4C) generates transverse torques in the satellite 20 when the LAM axis (68 in FIGS. 4A–4C) is offset from the satellite's center of mass (86 in FIGS. 4A–4C). These transverse torques initiate transverse angular rotations of the satellite 20. In response, the thruster feedback control loop 142 fires thrusters to generate correction torques that substantially null out the attitude and rate errors. This portion of the control system 120 can therefore maintain a predetermined inertial direction of the LAM's axis. However, this control is fuel-inefficient because it requires extended use of the thrusters.

Because the position and rate error signals ($\Delta q$, $\Delta\omega$) have been nulled by the thruster feedback control loop, they are not available for use by the wheel feedback control loop 144. If the wheel control were an independent control system having access only to quantities that could be derived from attitude sensors (e.g., position and rate), the nulled signals would leave little substance to work with.

Instead, this control loop responds to an estimate of the satellite's disturbance torques (due to the LAM firing) and generates (via signal conversion in the wheel spin balancing control logic 136) appropriate wheel torque commands 138. In response, the wheel system ((72 in FIGS. 4A–4C) generates a wheel momentum vector such that the cross product of the satellite's angular velocity vector and the wheel momentum vector is the opposite of the LAM-induced disturbance torque. These gyroscopic correction torques created through the action of the wheel feedback control loop 144 effectively reduce correction torques of the thruster feedback control loop 142 and, thereby, reduce thruster fuel consumption.

In particular, Euler's equations for a rigid-body satellite can be written as $$I\dot{\omega}+\dot{h}+\omega\times(I\omega+h)=T_{th}+T_{ext} \quad (1)$$

and rearranged as $$I\dot{\omega} =T_{th}-\dot{h}+T_{ext}+T_{imbal}-\omega\times h \quad (2)$$

in which I is the satellite's composite inertia matrix about its center of mass, $\omega$ is satellite angular velocity, h is composite wheel momentum, $T_{th}$ is thruster system torque, $T_{ext}$ is external disturbance torque and $T_{imbal}$ is an imbalance disturbance torque of $-\omega\times(I\omega)$ due to unbalanced mass distributions about the satellite's spin axis.

It is desired to cancel the disturbance torque $T_{dist}$ by altering the composite wheel momentum h with a wheel torque $T_{whl}=\dot{h}$ so that $$T_{dist}=T_{ext}+T_{imbal}-\omega\times h=0. \quad (3)$$

In our desired final state of steady spin, the satellite's spin speed will be constant (i.e., the derivative of $\omega$ will be zero), the thrusters will be off (i.e., $T_{th}=0$) and the wheels will not be torquing (i.e., the derivative of h will be zero). Comparing equations (2) and (3), we see that this condition is equivalent to $T_{dist}=0$. This explains our desire to bring h to the point where $T_{dist}=0$.

A preferred embodiment is to estimate the net disturbance torque, $T_{dist}$, and create a wheel torque in a direction perpendicular to $T_{dist}$ and the desired direction of $\omega$ (parallel to $\omega^{desired}\times T_{dist}$). This wheel torque moves the internal wheel momentum h in the appropriate direction to reduce $T_{dist}$. The actual motion of h is somewhat insensitive, since the component of h parallel to $\omega$ does not create gyroscopic torque, and the feedback nature of the system will eventually correct for an erroneous direction of h that does create gyroscopic torque.

In FIG. 5, the input to the wheel feedback control loop 144 is the disturbance acceleration $\alpha_d$ rather than the disturbance torque—this is an implementation choice. Since the disturbance torque and disturbance acceleration are related by the inertia matrix I, one can easily convert from one to the other.

The key issue in coordinating the thruster and wheel control systems is that the dynamics observed by attitude control sensors cannot separate the components of $T_{ext}+T_{th}$. Equation (1) above shows this; $T_{ext}$ and $T_{th}$ appear only as their sum. The reason this is undesirable can be seen by considering the case where $T_{ext}+T_{th}=0$. If $T_{ext}+T_{th}=0$ because both $T_{ext}$ and $T_{th}$ are zero, this is desirable—the case where $T_{ext}+T_{th}=0$ because $T_{ext}$ and $T_{th}$ are large but opposite is much less desirable, because it means that thruster fuel is being consumed at a high rate. An independent wheel system (one without information about the activity of the thruster control system) cannot distinguish between the two.

We define a cooperative wheel control system as one that has information (explicitly or implicitly) about $T_{th}$, and an independent wheel control system as one that only has information about the sum of $T_{dist}$ and $T_{th}$.

An example of a cooperative wheel system using implicit information about $T_{th}$ is the control system 120 of FIG. 5, in which both thruster and wheel torque controls respond to a disturbance acceleration estimate $\alpha_d$. In the case in which information about the commanded thruster torque, $T_{th}$, is fed forward to the estimator 128, it is easy to see that the wheel system can receive the benefit of a disturbance estimate that has the effect of $T_{th}$ largely removed (the wheel spin torque, dh/dt, also effects the sensor observations, but if it is not explicitly given to the estimator, it is typically small enough compared to the thruster torques that this omission has little effect on performance).

Even when the estimator does not receive the commanded thruster torque directly (e.g., when the estimator estimates the disturbance acceleration by receiving the position and/or rate errors from comparator 130 and performing integral shaping of them), the steady state action of the thruster system in the absence of the wheel system is directly proportional to the disturbance torque estimate (since the rate and position errors are zero at that point), so we see that the disturbance acceleration estimate can be used by the wheel system as an implicit measure of thruster activity in this case as well. An example of a cooperative wheel system that uses explicit information is described below with reference to system 220 of FIG. 8, in which a wheel feedback control loop 222 receives the thruster torque command 134 as a direct input.

Even in cases where the thruster system does not totally cancel the external torque (as in a thruster control using strictly proportional position error feedback) an independent wheel control system cannot distinguish between a system in which $T_{th}+T_{dist}$ is nearly zero because $T_{th}$ nearly cancels $T_{dist}$, and a system in which $T_{th}+T_{dist}$ is nearly zero because $T_{dist}$ is small and $T_{th}$ is zero. Because of this, the response of an independent wheel system is likely to be too dilatory (in the first case) or too aggressive (in the second case). This wastes fuel in the first case, and wheel power in the second (since the aggressive system will react sharply to sensor noise).

While FIG. 5 depicts a thruster feedback control logic 132 with input signals of position error $\Delta q$, rate error $\Delta \omega$ and disturbance acceleration estimate $\Delta_d$, the thruster portion of the system can be satisfactorily implemented in many cases with as few as one of these input signals.

A first example is a satellite spin axis control system in which the thruster feedback control logic 132 receives only a position error $\Delta q$. Such a position-only system can reduce the coning angle to a value proportional to the disturbance torque, and inversely proportional to the position feedback gain. It can even reduce the coning angle to nearly zero if an integral error term is included in the thruster feedback control logic.

A second example is a satellite spin axis control system in which the thruster feedback control logic receives only a rate error $\Delta \omega$ or both a rate error and a position error. Other viable systems can be formed with only an angular acceleration input signal.

A LAM burn was simulated under control of the methods of the invention. In this simulation, a nominal spin speed about the z axis was assumed to be 1 rpm and a wheel feedback control loop time constant of 50 seconds was chosen. The simulation results are shown in the graphs 160, 162, 164 and 166 of FIG. 6A and graphs 168 and 170 of FIG. 6B. Graphs 160 and 162 respectively illustrate wheel speeds and wheel torques. Graph 164 shows the cone angle between the desired spin axis and the momentum vector. The accumulated firing time of the thruster system (70 in FIGS. 4A–4C) is shown in graph 166. The satellite's angular velocity is shown in graph 168 and inertial motion of the satellite's z axis is shown in graph 170.

In this simulation, the satellite was initially balanced about its body z axis by wheel-induced momentum. Only two wheels (of the wheel system 72 of FIGS. 4A–4C) were used in the simulation to generate transverse torques. The wheel feedback control loop 144 was initiated at 400 seconds and the LAM (38 in FIGS. 4A–4C) was fired from 500 to 1500 seconds. The LAM disturbance torque was −2.5 N-m along the satellite's y axis (corresponding to ~0.49 cm offset from the center of mass). The thruster feedback control loop 142 and the wheel feedback control loop 144 were terminated at ~1900 seconds when the satellite was rebalanced and control was turned over to a wheel nutation control loop (similar to one described by Salvatore in the above-mentioned references).

Wheel-induced momentum offsets the disturbance torque and effectively replaces thruster-induced torques. As a result of the wheel momentum, however, the total momentum vector is misaligned from the LAM axis so that a large cone angle is generated. After the disturbance torque ceases (LAM turnoff), the wheel feedback control loop 144 applies torques to reduce the coning angle. Graph 170 shows that pointing of the satellite was properly maintained except for brief transients at LAM turnon and turnoff.

Figure 6A:
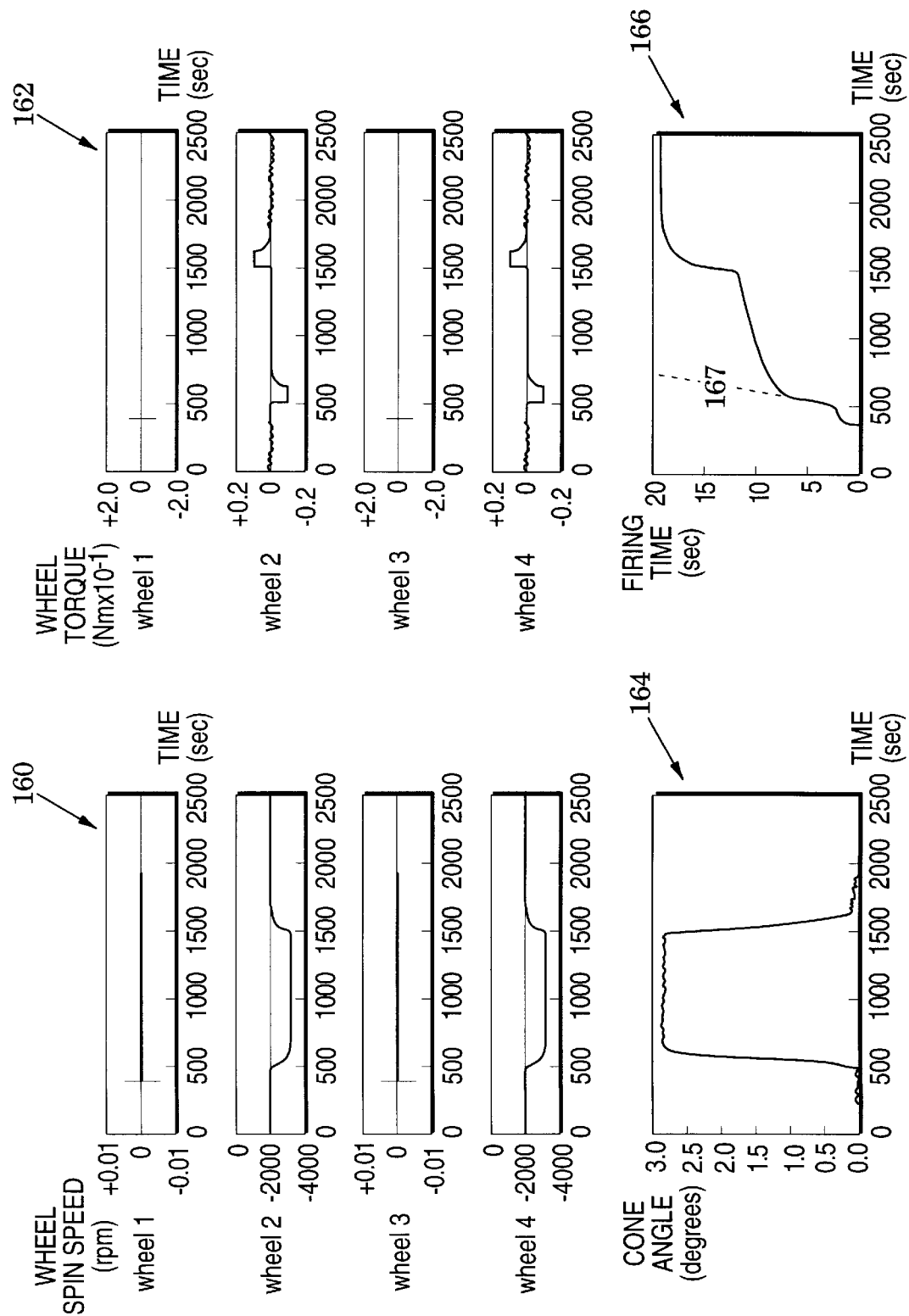
FIGS. 6A and 6B illustrate results of a simulated burn of the LAM of the satellite of FIGS. 4A–4C.
Figure 6B:
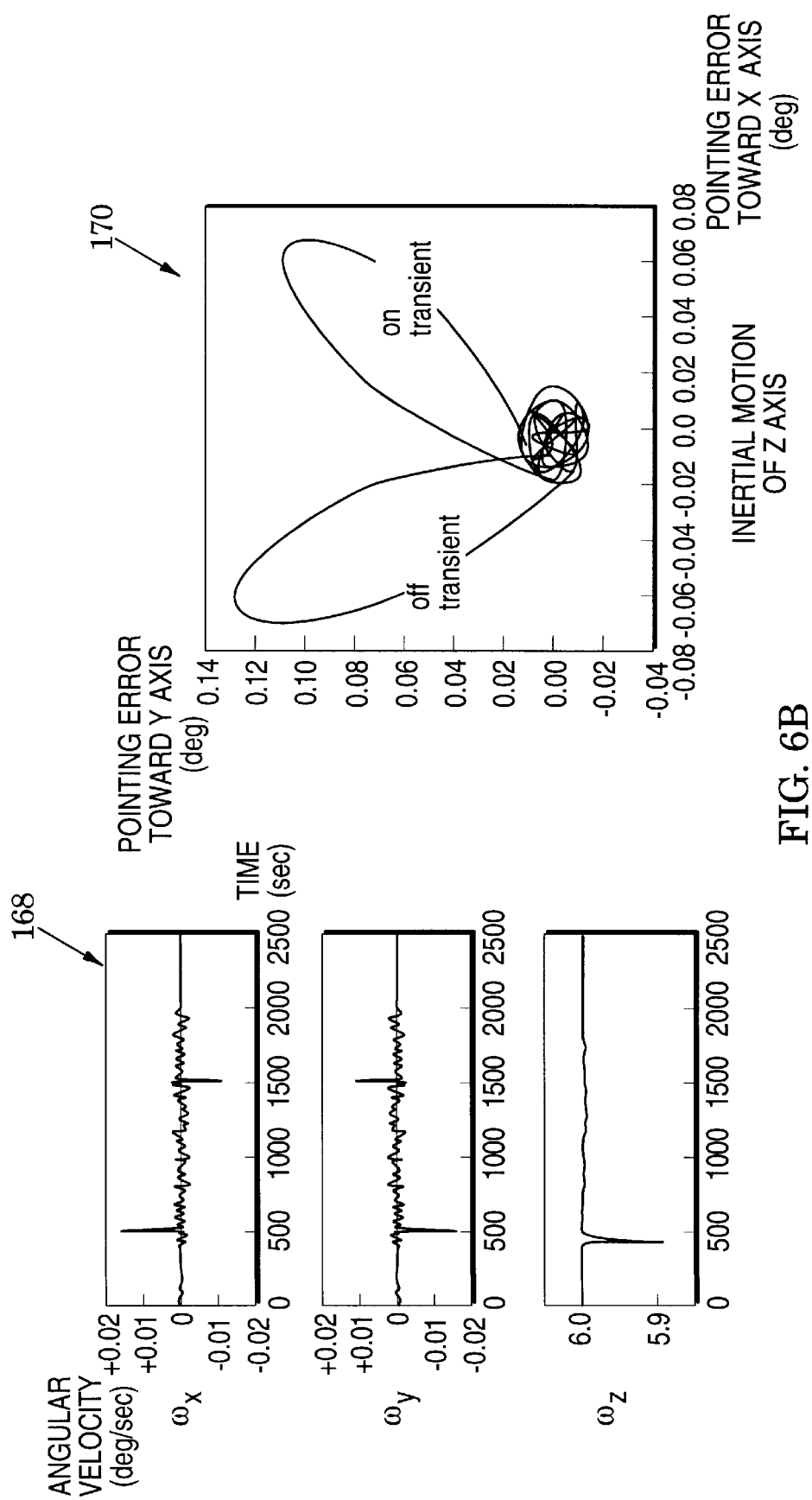

From the graphs of FIGS. 6A and 6B, it is observed that the desired spin axis and the satellite's momentum vector were aligned (i.e., the satellite was balanced) prior to LAM initiation and the transition to LAM firing caused minimal pointing error of the satellite. After wheel speeds reach steady-state, thruster activity is reduced (thruster duty cycle is less than 1% at steady-state) so that accumulated thruster firing time (graph 166) has only a slight slope. After the LAM burn, the wheel feedback control loop 144 drives wheel speed to a level that dynamically rebalances the satellite and reduces the cone angle to less than 0.1 degree.

Accordingly, thruster fuel use was significantly reduced. The broken line 167 in graph 166 indicates accumulated firing time in absence of the wheel feedback control loop 144. It can be seen that fuel use would be significantly higher in this case.

The methods of this invention can also be implemented by ground commands to shift internal momentum in a fashion similar to that done by the closed-loop wheel system 120 of FIG. 5. For example, ground commanded open-loop wheel spin speed changes can be done by ground commands or on-board stored commands based on an evaluation of the LAM torque from prior LAM burns, calculated shifts in the satellite's center of mass due to consumption of fuel and/or based on observed thruster activity during the current LAM burn. Predetermined disturbance torque estimates can be obtained in various ways (e.g., received and/or stored as respectively indicated in FIG. 5 by an exemplary receiving element 172 and an exemplary storage element 174 whose content is accessed through an representative switch).

In some cases, a considerable performance improvement can be had by use of anticipatory open-loop wheel control in addition to or in place of the closed-loop wheel spin balancing control logic 136 of FIG. 5. Specifically, the required thruster torque authority and thruster fuel required can be reduced by almost a factor of two in the LAM burn operational example if the wheel momentum shifts are performed in anticipation of the shifts in the disturbance torque (i.e., if at least a portion of the wheel correction torques are applied prior to a shift time $T_{st}$ of the disturbance torques).

In the example shown in FIGS. 6A and 6B, the wheels typically take about two minutes to move from the appropriate momentum for spin balancing without LAM torque to the appropriate momentum with LAM torque. This is because countering the 2.5 N-m LAM torque at 1 rpm (0.105 rad/sec) requires a change in internal momentum of 23.8 N-m-s in a direction perpendicular to the spin axis to generate the necessary $-\omega \times h$ torque change of 2.5 N-M. Since the wheel spin torque (dh/dt) is 0.2 N-m, this requires 119 seconds with a single wheel in the ideal direction. The actual time taken in FIGS. 6A and 6B is different due to factors such as the use of two wheels, the non-ideal alignment of the LAM torque to the wheel axes and the chosen wheel control loop time constant.

Assuming a single ideal wheel for the purposes of computation, the closed-loop wheel spin balancing system requires a thruster torque of 2.5 N-m when the LAM turns on or off and takes 119 seconds to ramp down to zero, for a total of 149 N-m-s of required thruster impulse. With an open-loop system, the wheel momentum shift could be started about 60 seconds before LAM turnon. The thruster system will maintain the commanded spin direction while ramping to about 1.25 N-m at the point of LAM turnon. At LAM turnon, the net torque from LAM plus wheel gyroscopic torque will be 1.25 N-m (since the wheels are half-way to the momentum that cancels the LAM torque) and the thruster control will switch to -1.25 N-m and then ramp up to zero.

The peak thruster torque magnitude is 1.25 N-m in this case, and the integral of the magnitude of required thruster impulse is 74.5 N-m-s. This is half the torque, and half the thruster impulse (fuel) required in the closed loop case. The closed-loop system can be engaged at some point after LAM turnon, to take out errors in the open-loop prediction of the LAM torque.

A similar anticipatory open-loop maneuver can be done in preparation for LAM turnoff by starting the movement of the internal momentum early so that the internal momentum is only cancelling half the LAM torque at LAM turnoff. Note that the anticipatory open-loop maneuver for LAM turnoff can be performed on even the first LAM burn, since it does not require a prediction of the LAM torque, but only a prediction of the appropriate wheel balancing momentum when the LAM is off. This will typically be close to the appropriate value before LAM turnon.

While arranging for half the LAM torque to be cancelled at LAM turnon or turnoff is ideal in this example, it should be noted that the timing of the anticipatory wheel control is not critical—a 30 second or a 90 second head start would reduce thruster fuel consumption and peak thruster torque from the closed-loop case as well, but to a lesser extent than the 60 second head start.

In another operational example of the invention, the spin speed of the satellite 20 of FIGS. 4A–4C about its z axis is altered. Assuming the wheel system 70 had previously balanced the satellite so that the total momentum vector was aligned with the spin axis, the momentum vector will be offset from the spin axis because of the altered spin speed. The reason for the offset can be seen from equation (1). The imbalance torque $-\omega \times (I\omega)$ is proportional to the square of spin speed $\|\omega\|^2$ and the wheel balancing torque $-\omega \times h$ is proportional to spin speed $\|\omega\|$. If these torques cancel for one value of $\|\omega\|$, they generally will not cancel for a different value.

Consequently, the satellite begins to wobble and this disturbance is corrected by the thruster feedback control loop (142 in FIG. 5). Thus, the satellite is directed along the desired inertial direction and the momentum vector (due to imbalance) now cones about this direction. This operational mode could continue to hold the inertial direction but at the cost of thruster fuel consumption. At the time of thruster control termination, the inertial direction of the LAM axis will cone around the direction of the momentum vector which causes a significant pointing error.

Accordingly, the wheel feedback control loop 144 is activated and it adjusts wheel speeds so that the satellite is rebalanced. Thus, the cone angle is essentially eliminated and use of thruster fuel is reduced. Termination of control now results in a minimal pointing error because of the reduced cone angle.

Figure 7A:
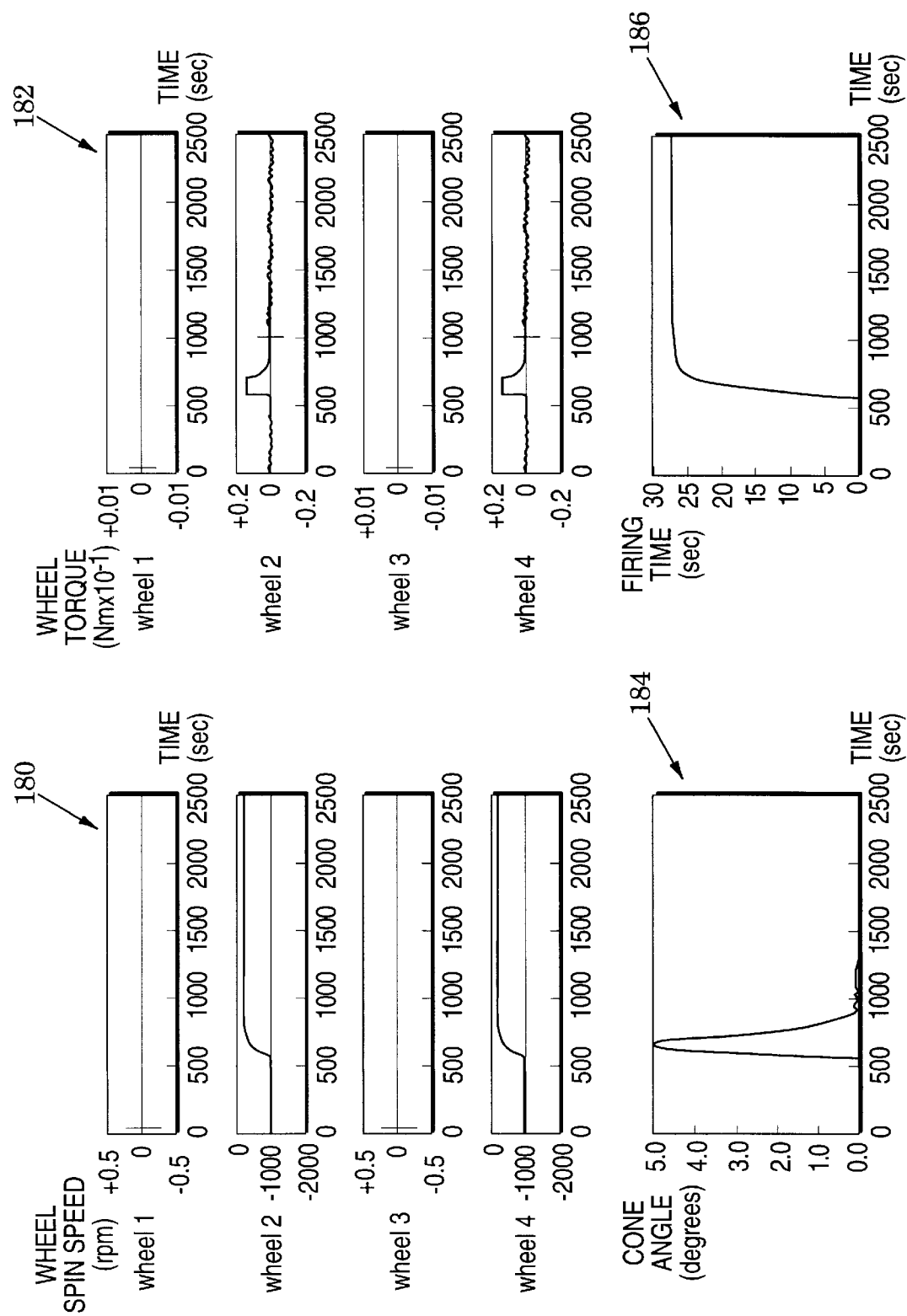
FIGS. 7A and 7B illustrate results of a simulated spin speed change of the satellite of FIGS. 4A–4C.
Figure 7B:
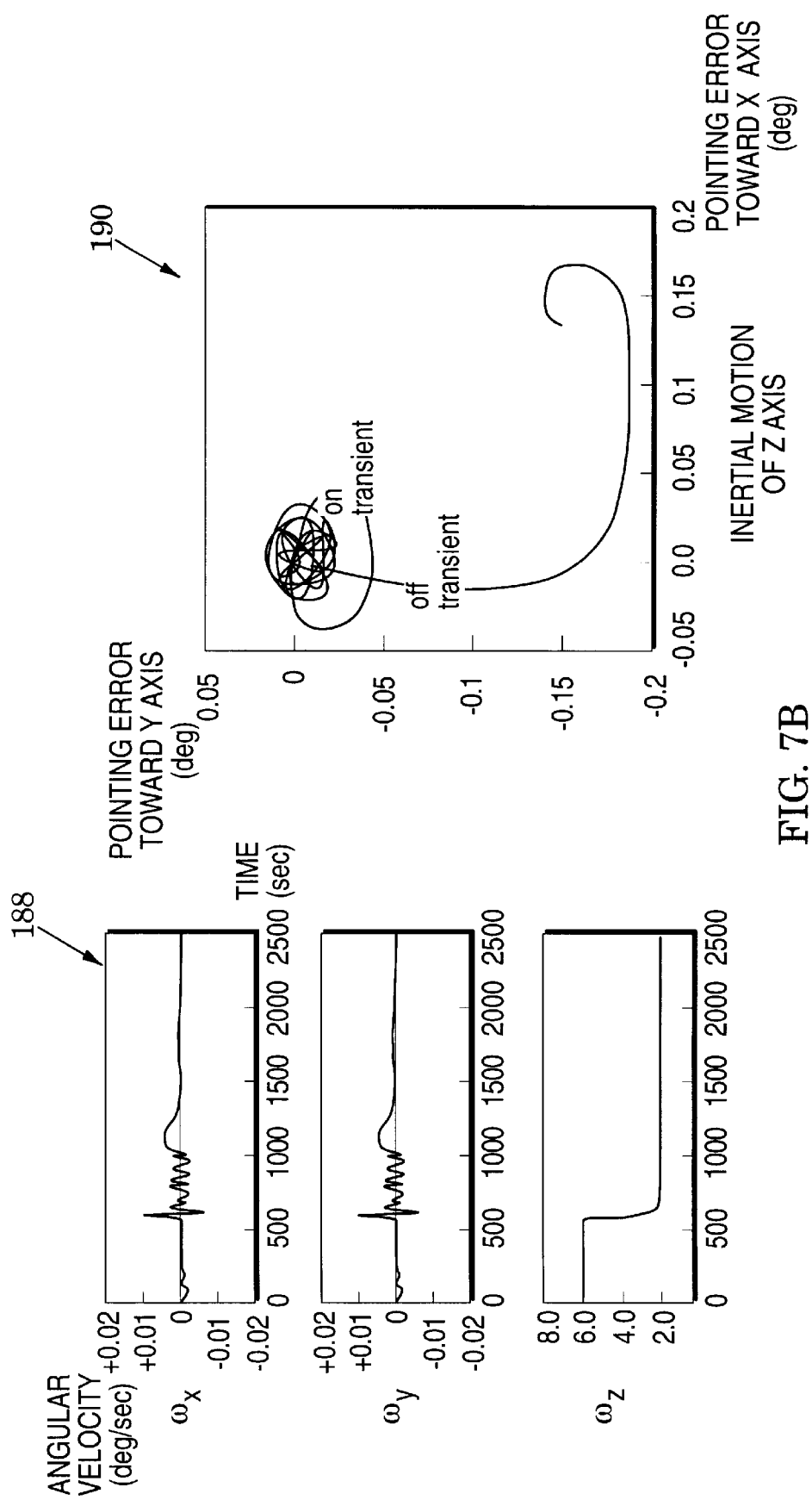

In this operational example, a spin speed change of 1 rpm to ⅓ rpm was simulated and the results are shown in the graphs 180, 182, 184 and 186 of FIG. 7A and graphs 188 and 190 of FIG. 7B. These graphs are respectively similar to graphs 160, 162, 164, 166, 168 and 170 of FIGS. 6A and 6B.

In this simulation, the satellite was initially balanced with momentum of the wheel system. At ~600 seconds, the thruster feedback control loop 142 and the wheel feedback control loop 144 were activated and the new spin speed was commanded. The control loops were then terminated at ~1000 seconds and control was switched to an all-wheel system.

Graph 184 indicates that the cone angle initially increased (because of the speed change and subsequent change of the momentum vector) but was quickly driven towards zero by rebalancing effected by the wheel feedback control loop 144. Consequently, only a small pointing error (less than 0.2 degree) is indicated in graph 190 when the loop control is terminated (off transient). Without the wheel feedback control loop 144, this pointing error would have been considerably larger (e.g., ~7.4 degrees). Graph 186 shows an initial fuel use (firing time) followed by a period of minimal fuel use.

Wheel feedback control loops of the invention automatically balance static thruster torques. In the spin and attitude control system 120 of FIGS. 4A–4C, the loop responds to an estimate of disturbance torque. In particular, this estimate may be provided by the thruster torque command or a filtered (e.g., to remove transients) version of the thruster torque command.

Figure 8:
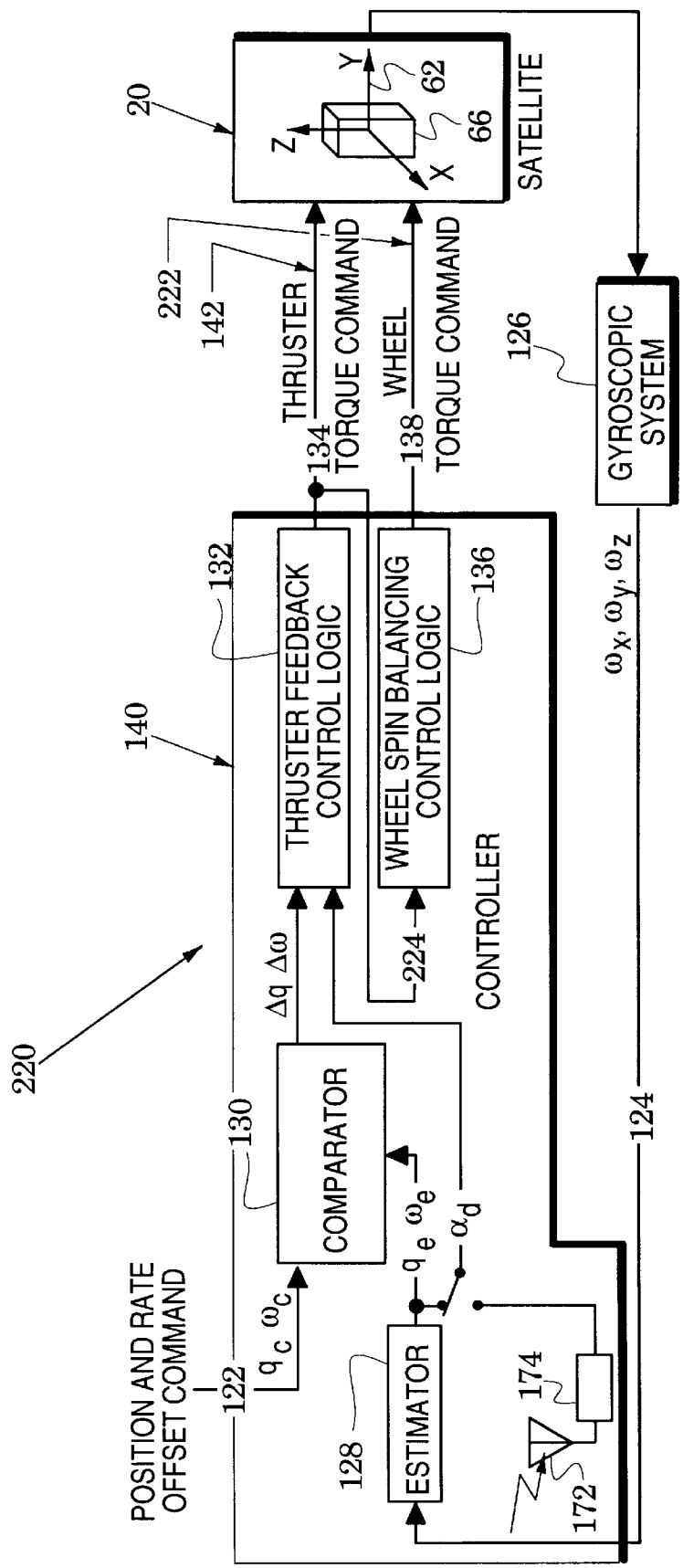
FIG. 8 is a block diagram of another spin and attitude control system in the satellite of FIGS. 4A–4C.

The thruster torque command is used in the spin and attitude control system 220 of FIG. 8. The embodiment of FIG. 8 is similar to that of FIG. 5 with like elements indicated by like reference numbers. In contrast to the wheel feedback control loop 144 of FIG. 5, a wheel feedback control loop 222 has its error signal (i.e., its disturbance torque estimate) provided by the thruster torque command 134 as shown by the signal path 224. Essentially, the large time constant of the wheel spin balancing loop causes it to null the thruster command in an averaged sense.

A simulation similar to that shown in FIGS. 6A and 6B was conducted for this control system. The results were very similar to those shown in these figures except that noise signals were apparent on the wheel torque signals of graph 162. These noise signals indicated that the wheels at steady state were torquing back and forth to follow the thruster pulses. Accordingly, wheel power consumption increased as compared to that indicated by the performance of FIGS. 6A and 6B. The noise signals could be reduced by applying a low pass filter to remove noise from signal 224 and reduce power consumption.

Other structural and method embodiments of the invention can be easily formed with alternate disturbance torque estimates. For example, a predetermined estimate of the disturbance torque can be stored and used as an open-loop error signal for the wheel feedback control loop 222. A control system of the invention could conduct an entire satellite maneuver with the stored estimate and an open-loop arrangement or time share this arrangement with a closed-loop arrangement.

The concepts of the invention have been primarily described with reference to orbit injection but they may be applied to various satellite maneuvers. Although the thruster system 70 and a wheel system 72 have been described to have the exemplary configurations of FIGS. 4A–4C, other thruster and wheel configurations can be used in practicing the teachings of the invention.

For example, it was previously mentioned that the teachings of the invention could be practiced with wheel systems having one or two degrees of freedom (e.g., by respectively using one or two of the wheels of the system 72 of FIGS. 4A–4C). A wheel system generates corrective torque primarily by the wheel gyroscopic torque (ω×h), and the gyroscopic torque only makes use of the two degrees of freedom of momentum perpendicular to ω to create useful torques. Therefore, a two wheel system that allows generation of momentum components in two degrees of freedom spanning a plane perpendicular to ω is fully adequate (as shown in the graphs of FIGS. 6A and 6B).

Even a single wheel, however, can be put to good use. A primary goal of the invention is to reduce system fuel consumption, and cancelling even one component of the LAM torque can save appreciable thruster fuel. For a satellite spinning about its z axis and having a single wheel along the y axis, for example, disturbance torque along the x axis can be opposed by using the single wheel to create momentum along the y axis.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method for controlling rotation rate and attitude of a satellite which is subjected to disturbance torques, the method employing cooperative thruster and wheel systems and comprising the steps of:

commanding at least one parameter of a desired satellite rotation rate parameter, a desired satellite attitude parameter and a desired angular acceleration parameter;

comparing said commanded parameters with sensed rotation parameters of said satellite to generate at least one error signal of an attitude error signal, a rotation rate error signal and an angular acceleration error signal;

generating an estimate of said disturbance torques;

in response to said generated error signal and said disturbance torques estimate, applying thruster correction torques to said satellite to reduce said error signal; and in response to said disturbance torques estimate, applying wheel correction torques to said satellite to reduce the magnitude of said thruster correction torques and thereby reduce the use of thruster fuel.

2. The method of claim 1:

wherein said generating step includes the step of estimating, from said sensed rotation parameters, an angular acceleration estimate;

and wherein said disturbance torques estimate is said angular acceleration estimate.

3. The method of claim 1:

wherein said thruster correction torque applying step includes the step of generating a thruster torque command for application to said thrusters;

and wherein said wheel correction torques are responsive to said thruster torque command.

4. The method of claim 1:

wherein said thruster correction torque applying step includes the step of generating a thruster torque command for application to said thrusters;

and further including the step of filtering transients from said thruster torque command to form a filtered thruster torque command;

and wherein said wheel correction torques are responsive to said filtered thruster torque command.

5. The method of claim 1, wherein said disturbance torques include transverse disturbance torques on said satellite and wherein said wheel correction torques applying step includes the step of generating gyroscopic torques with at least one wheel of said wheel system that oppose said transverse disturbance torques.

6. The method of claim 5, wherein said wheel is a momentum wheel.

7. The method of claim 5, wherein said wheel is a reaction wheel.

8. A method for controlling rotation rate and attitude of a satellite which is subjected to disturbance torques, the method employing cooperative thruster and wheel systems and comprising the steps of:

commanding at least one parameter of a desired satellite rotation rate parameter, a desired satellite attitude parameter and a desired angular acceleration parameter;

comparing said commanded parameters with sensed rotation parameters of said satellite to generate at least one error signal of an attitude error signal, a rotation rate error signal and an angular acceleration error signal;

forming a predetermined estimate of said disturbance torques;

in response to said generated error signal and said disturbance torques estimate, applying thruster correction torques to said satellite with a thruster system wherein said correction torques reduce said error signal; and in response to said predetermined disturbance torques estimate, applying wheel correction torques to said satellite to reduce the magnitude of said thruster correction torques and thereby reduce the use of thruster fuel.

9. The method of claim 8, further including the step of estimating a shift time $T_{st}$ of said disturbance torques and wherein said wheel correction torques applying step includes the step of initiating at least a portion of said wheel correction torques prior to said shift time $T_{st}$ to further reduce the use of thruster fuel.

10. The method of claim 8, wherein said disturbance torques include transverse disturbance torques on said satellite and wherein said wheel correction torques applying step includes the step of generating gyroscopic torques with at least one wheel of said wheel system that oppose said transverse disturbance torques.

11. The method of claim 10, wherein said wheel is a momentum wheel.

12. The method of claim 10, wherein said wheel is a reaction wheel.

13. A control system for controlling rotation rate and attitude of a satellite which is subjected to disturbance torques, the system comprising:

a sensor system which senses rotation parameters of said satellite;

a comparator which generates at least one error signal of attitude, rotation rate and angular acceleration error signals in response to said sensor system and to at least one of commanded attitude, rate and angular acceleration signals;

an estimator which forms an estimate of said disturbance torques;

a thruster system which generates thruster correction torques in said satellite in response to said generated error signal and said disturbance torques estimate; and a wheel system which responds to said disturbance torques estimate by generating wheel correction torques in said satellite that reduce said thruster correction torques and thereby reduce the use of thruster fuel.

14. The control system of claim 13, wherein:

said sensor system is a gyroscopic system; and said wheel system includes a plurality of noncolinear reaction wheels.

15. The control system of claim 13, further including:

a thruster control logic system which generates a thruster torque command signal from said generated error signal and applies said thruster torque command signal to said thruster system; and a wheel control logic system which generates a wheel torque command signal from said thruster torque command signal.

16. The control system of claim 13, wherein said thruster system is a 3 axis system.

17. The control system of claim 13, wherein said wheel system has only one degree of freedom.

18. The control system of claim 13, wherein said wheel system includes at least one momentum wheel.

19. The control system of claim 13, wherein said wheel system includes at least one reaction wheel.

20. A control system for controlling rotation rate and attitude of a satellite which is subjected to disturbance torques, the system comprising:

a sensor system which senses rotation parameters of said satellite;

a comparator which generates at least one error signal of attitude, rotation rate and angular acceleration error signals in response to said sensor system and to at least one of commanded attitude, rate and angular acceleration signals an estimator which forms an estimate of said disturbance torques;

a thruster control logic system which generates a thruster torque command signal from said generated error signal and said disturbance torques estimate;

a thruster system which generates thruster correction torques in said satellite in response to said thruster torque command signal; and a wheel system which responds to said thruster torque command signal and generates wheel correction torques in said satellite that reduce said thruster correction torques and thereby reduce the use of thruster fuel.

21. The control system of claim 20, wherein:

said sensor system is a gyroscopic system; and said wheel system includes a plurality of noncolinear reaction wheels.

22. The control system of claim 20, wherein said thruster system is a 3 axis system.

23. The control system of claim 20, wherein said wheel system has only one degree of freedom.

24. A satellite system which controls rotation rate and attitude in the presence of disturbance torques, the system comprising:

a satellite; and a control system carried by said satellite and having:
  a) a sensor system which senses rotation parameters of said satellite;
  b) a comparator which generates at least one error signal of attitude, rotation rate and angular acceleration error signals in response to said sensor system and to at least one of commanded attitude, rate and angular acceleration signals;
  c) an estimator which forms an estimate of said disturbance torques;
  d) a thruster system which generates thruster correction torques in said satellite in response to said generated error signal and said disturbance torques estimate; and
  e) a wheel system which responds to said disturbance torques estimate by generating wheel correction torques in said satellite that reduce said thruster correction torques and thereby reduce the use of thruster fuel.

25. The satellite system of claim 24, wherein:

said sensor system is a gyroscopic system; and said wheel system includes a plurality of noncolinear reaction wheels.

26. A satellite system which controls rotation rate and attitude in the presence of disturbance torques, the system comprising:

a satellite; and a control system carried by said satellite and having:
  a) a sensor system which senses rotation parameters of said satellite;
  b) a comparator which generates at least one error signal of attitude, rotation rate and angular acceleration error signals in response to said sensor system and to at least one of commanded attitude, rate and angular acceleration signals an estimator which forms an estimate of said disturbance torques;
  c) a thruster control logic system which generates a thruster torque command signal from said generated error signal and said disturbance torques estimate;

d) a thruster system which generates thruster correction torques in said satellite in response to said thruster torque command signal; and e) a wheel system which responds to said thruster torque command signal and generates wheel correction torques in said satellite that reduce said thruster correction torques and thereby reduce the use of thruster fuel.

27. The satellite system of claim 26, wherein:

said sensor system is a gyroscopic system; and said wheel system includes a plurality of noncolinear reaction wheels.

\* \* \* \* \*